United States Patent [19]

Takahashi et al.

[11] 4,348,697
[45] Sep. 7, 1982

[54] FACSIMILE APPARATUS

[75] Inventors: Shuichi Takahashi, Sagamihara; Fumihiro Ogasawara, Kawasaki; Syuichi Ohta, Atsugi, all of Japan

[73] Assignee: Ricoh Company, Limited, Tokyo, Japan

[21] Appl. No.: 137,258

[22] Filed: Apr. 4, 1980

[30] Foreign Application Priority Data

Apr. 16, 1979 [JP] Japan .................................. 54-46223

[51] Int. Cl.³ ...................... H04N 1/04; H04N 1/10; H04N 1/14
[52] U.S. Cl. .............................. 358/286; 346/139 A; 346/139 B; 358/285; 358/293
[58] Field of Search ............... 358/285, 289, 286, 293, 358/296, 297; 346/139 A, 139 B, 139 D

[56] References Cited

U.S. PATENT DOCUMENTS 3,849,592 11/1974 Rosenheck ........................... 358/289
3,943,529 3/1976 Feldman et al. ..................... 358/297
4,266,251 5/1981 Hara et al. ........................... 358/293

OTHER PUBLICATIONS

Gilkerson–Scan Pitch Control for Raster Scanners–vol. 15 #8, Jan. 1973, pp. 2482-2483.

Primary Examiner—Joseph A. Orsino, Jr.
Attorney, Agent, or Firm—Oblon, Fisher, Spivak, McClelland & Maier

[57] ABSTRACT

In a facsimile apparatus, a recording head and a reading head are mounted on a carriage and the carriage is reciprocated in the main scanning direction so that recording and reading of image information are performed and furthermore, a detector is mounted on the carriage for tracing and detecting slits formed in a scale plate, which is fixed to the facsimile apparatus along the movable path of the carriage, whereby the position of the carriage is determined and the moving speed and reciprocating movement of the carriage are controlled.

6 Claims, 7 Drawing Figures

FACSIMILE APPARATUS

BACKGROUND OF THE INVENTION

The present invention relates to facsimile apparatus and more particularly to a facsimile apparatus capable of reading image information and recording the same with a marked high image quality.

In a conventional facsimile apparatus, reading and recording are performed by scanning image information line by line; therefore, a reading element and a recording element for one line are required; and, accordingly, a great number of scanning elements and elements for the driving circuits are required in the conventional facsimile apparatus.

To be more specific, when read scanning and record scanning of an A4 (210×297 mm) size sheet are performed with an 8 lines/mm scanning line density, the reading and recording elements for 1728 bits are required, and, furthermore, transistors, resistors and condensers for driving the read and scanning elements are required. As a result, a great number of elements are required.

In the case where a head for scanning one line is constructed by aligning scanning elements in the main scanning direction, it is difficult to produce such a head accurately. Therefore, a head capable of covering half or one third of one line is conventionally used so that reading and recording of one line of image information are performed by shifting the head so as to cover the whole line. However, this system has a shortcoming in that the points of junction of each scanning part become uneven.

Furthermore, in the case of a facsimile apparatus of the type in which the scanning is performed line by line, the original or the recording sheet has to be fed line by line or several lines at a time mechanically using a motor to perform subscanning. In a facsimile apparatus of this type, however, the feeding speed varies due to the inertia of the motor when the scanning starts or stops. As a result, the space of each scanning line varies so that it is difficult to obtain good images.

The applicants of the present invention have proposed a facsimile apparatus capable of performing the read and record scanning, with the above-mentioned conventional shortcomings eliminated, in U.S. patent application Ser. No. 967,834 filed Dec. 18, 1978, and German Patent Application O.S.L. 2,854,845 filed Dec. 19, 1978.

Referring to FIG. 1, there is perspectively shown the facsimile apparatus disclosed in the United States Patent Application and the German Patent Application. FIG. 2 is a schematic cross section of the facsimile apparatus of FIG. 1. As shown in the figures, the facsimile apparatus comprises a scale plate 1 which is fixed to the apparatus, a carriage 2 which is disposed so as to be capable of reciprocating along the scale plate 1 and a D.C. motor 3 for driving the carriage 2.

On the plate 1, there are disposed slits 1a for regulating the main scanning position at the time of reading and recording, and slits 1s and 1e for defining an effective image width in which the read scanning and the record scanning are effective.

On the carriage 2, there are disposed a reading head 2a, a recording head 2b and a detector 2c for taking out a slit detection signal as the carriage moves along the plate 1.

To be more specific, on the reading head 2a, there are arranged reading elements for a plurality of bits for reading a plurality of lines in the subscanning direction from an original O, and the reading head 2a is designed so that an image corresponding to the image of the original O at the main scanning position is formed on the reading head 2a.

Furthermore, on the recording head 2b, there are arranged styli for recording image information for a plurality of lines in the subscanning direction on a recording sheet S.

In the detector 2c, there are arranged a light emitting element 2c1 and a light receiving element 2c2 in such a manner that they face each other across the plate 1 and a predetermined signal is detected from each slit by the light emitting element 2c1 and the light receiving element 2c2 as they move.

In FIG. 1 and FIG. 2, reference numeral 4 represents pulleys, reference numeral 5a and 5b guide bars and a wire for reciprocating the carriage 2 by the D.C. motor 3, reference numeral 6 sheet transfer rollers, reference numeral 7 a contact glass, reference numeral 8 a counter electrode, and reference numeral 22 a lamp for illuminating the original O, which is attached to an optical system 21.

By this construction, the carriage 2 is reciprocated by the D.C. motor 3 to perform the main scanning and when the original O or the recording sheet S is fed in the direction of the arrow to perform the subscanning, the image information for a plurality of bits in the subscanning direction is read or recorded in accordance with the signal obtained from the detector 2c. Thus the image information for a plurality of lines can be processed by one main scanning. Therefore, the subscanning of the original O or of the recording sheet S can be performed a plurality of lines at a time and, furthermore, the main scanning can be performed when the original O or the recording sheet S is stopped. As a result, the reading and recording of the image information can be done, while each scanning line is set parallel to each other.

Furthermore, in this facsimile apparatus, it is possible to reduce the number of the read and record scanning elements significantly, specifically down to the number of elements necessary for 64 bits in this case when other necessary conditions are taken into consideration and, accordingly, the number of circuit elements can be reduced. As a result, the total number of necessary elements can be reduced, helping to lower the cost of the facsimile apparatus.

In this facsimile apparatus, however, it is required that the carriage 2 be reciprocated at a constant speed the full width of the effective image area and, therefore, a tachometer generator or tachometer dynamo is attached to the D.C. motor 3 so that the rotation speed of the D.C. motor is controlled by the signal generated from the tachometer generator.

Therefore, the facsimile apparatus has a better function and effect than that of the conventional facsimile apparatus, but it requires such an additional device as the tachometer generator, making the facsimile apparatus nevertheless still more expensive than the conventional facsimile apparatus.

SUMMARY OF THE INVENTION

It is therefore an object of the present invention to provide a facsimile apparatus which is inexpensive and capable of reading and recording image information reliably by eliminating the shortcomings of the conventional facsimile apparatus.

In order to attain this object, according to the present invention, slits are formed with a predetermined pitch in a scale plate, which is disposed along the path of the carriage, beyond the effective image width of the range where the carriage is movable, so that by the signals obtained from the slits through the detector, the reading and recording are controlled and, at the same time, the speed of a D.C. motor for moving the carriage is also controlled, whereby the speed control of the D.C. motor is simplified and the reading and recording of image information can be performed reliably.

DETAILED DESCRIPTION OF THE PREFERRED EMBODIMENT

Figure 1:
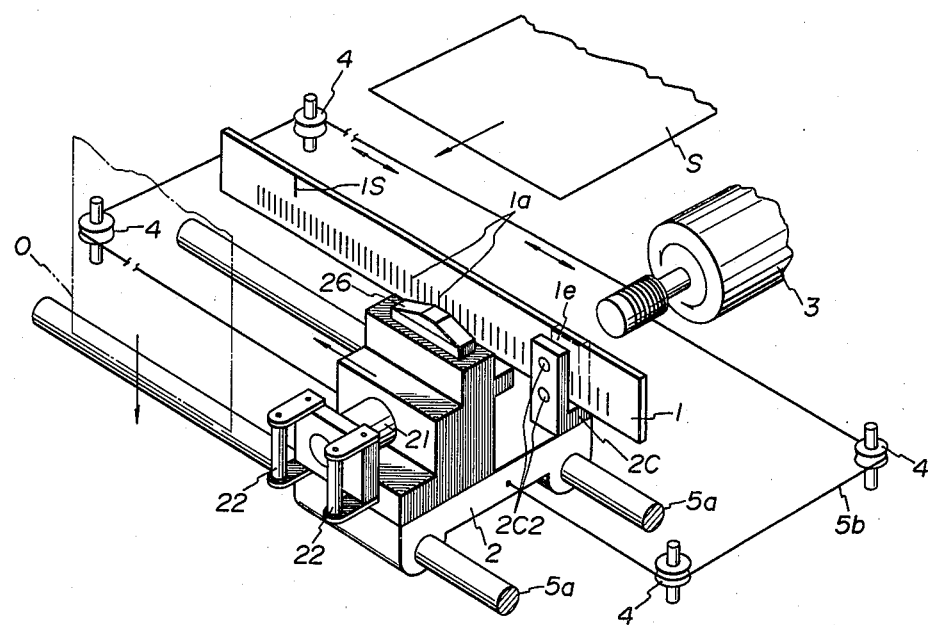
FIG. 1 is a schematic perspective view of a facsimile apparatus proposed previously by the applicants of the present invention.
Figure 2:
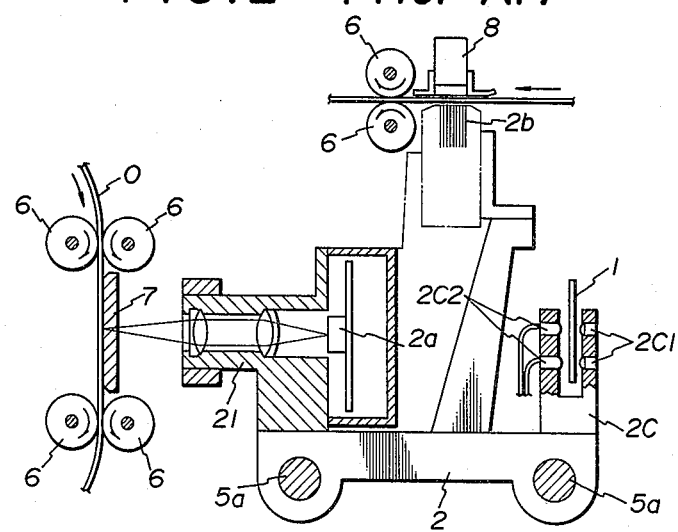
FIG. 2 is a schematic cross section of the facsimile apparatus of FIG. 1.
Figure 3:
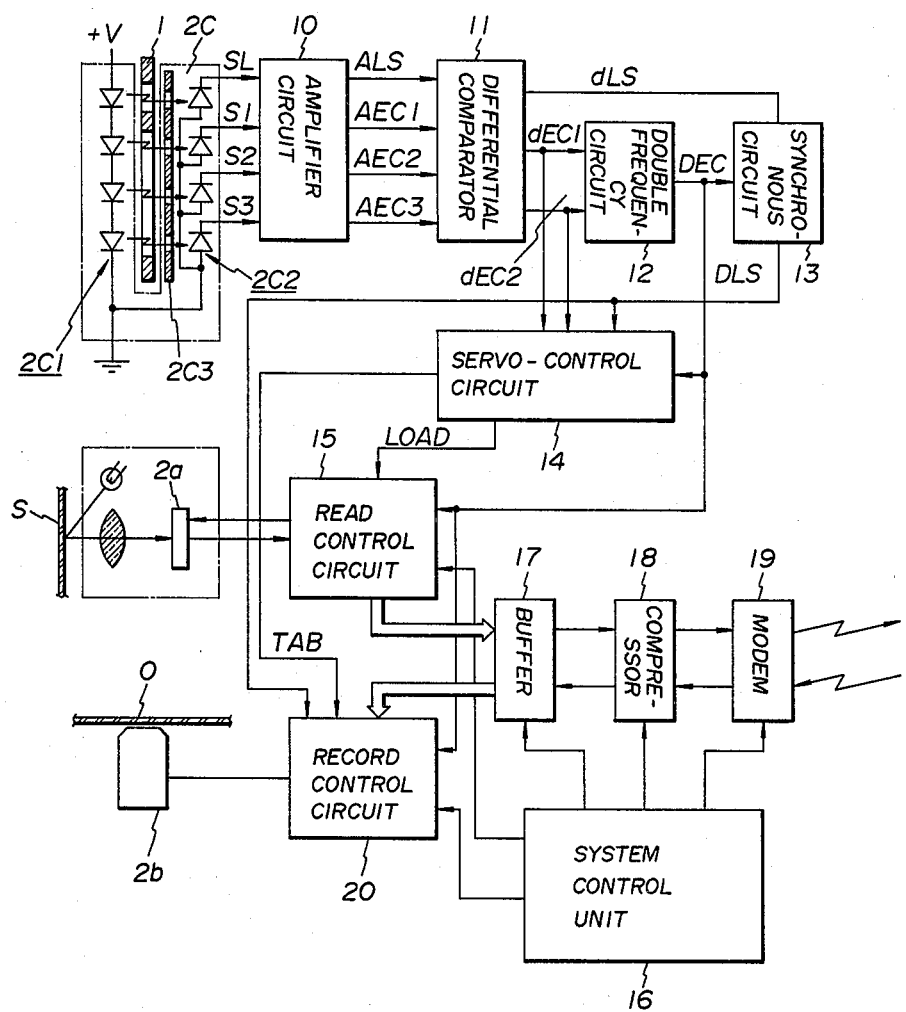
FIG. 3 is a block diagram of an embodiment of a facsimile apparatus according to the present invention.

Referring to FIG. 3, there is shown a block diagram of an embodiment of a facsimilie apparatus according to the present invention. In the figure, the same reference numerals employed in FIGS. 1 and 2 represent the same components or portions as those of the facsimile apparatus of FIG. 1 and FIG. 2.

In this embodiment, the slits 1a of the scale plate 1 are formed with an interval of 4 lines/mm since production of the slits with an interval of as small as 8 lines/mm is difficult.

Further, the light emitting element 2c1 disposed on the detector 2c consists of 4 light emitting diodes. One of the light emitting diodes is a diode for obtaining a line synchronization DLX signal as will be described in detail later, and the other three diodes work cooperatively and produce an element clock DEC signal, which will be described later. The light receiving element 2c2 consists of four photo diodes which correspond to the above-mentioned four light emitting diodes. The photo diodes are constructed so as to receive light through a mask plate 2c3 having predetermined openings for the respective photo diodes.

In FIG. 3, reference numeral 10 represents an amplifier circuit, reference numeral 11 a differential comparator, reference numeral 12 a double frequency circuit, reference numeral 13 a synchronous circuit, reference numeral 14 a servo-control circuit, reference numeral 15 a read control circuit, reference numeral 16 a system control unit, reference numeral 17 a buffer, reference numeral 18 a compressor, reference numeral 19 a modem, and reference numeral 20 a record control circuit.

Figure 4:
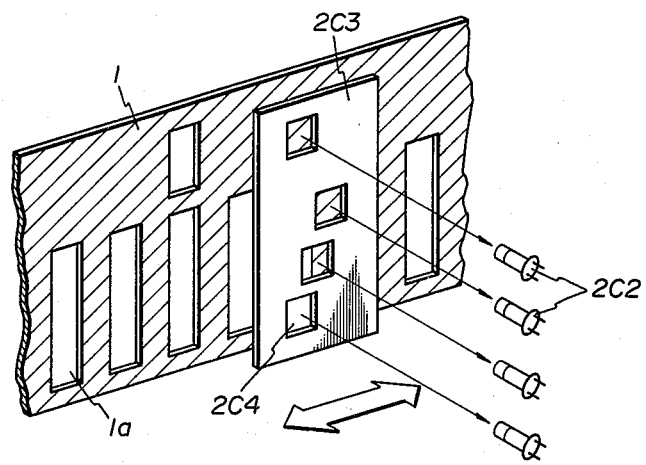
FIG. 4 is a perspective view of a detecting portion of the facsimile apparatus of FIG. 3.
Figure 5:
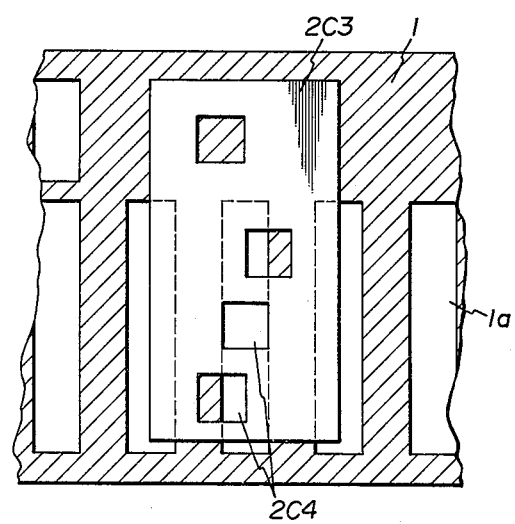
FIG. 5 is a schematic plan view of the detecting portion of FIG. 4.

Referring to FIG. 4, there is shown the configuration of the slits 1a of the plate 1, the mask plate 2c3 and the light receiving element 2c2. As shown in FIG. 5, the slits 1a are formed with respect to the openings 2c4 of the plate 2c3 in such a manner that each of the openings 2c4 has a 90° phase difference with respect to the pitch of the slit 1a.

Therefore, as the carriage 2 moves, the light receiving elements 2c2 are moved together with the mask plate 2c3 along the plate 1 and signals SL and S1 to S3 are generated from the respective photo diodes.

When these signals are amplified by the amplifier circuit 10 and are then taken out, an analog line synchronization signal ALS, and analog element signals AEC1 to AEC3, are obtained.

Figure 6:
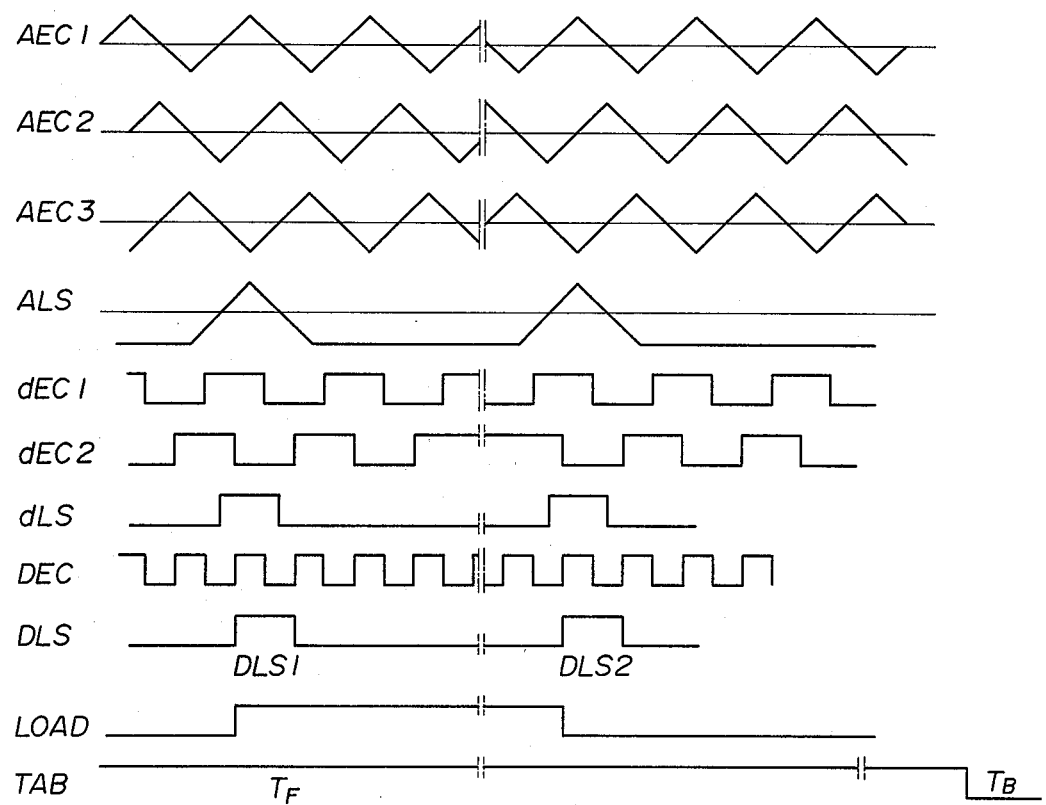
FIG. 6 is a wave form chart for explaining the operation of the embodiment of the facsimile apparatus of FIG. 3.

The analog element signals AEC1 to AEC3 are triangular waves which are respectively shifted by 90° as shown in FIG. 6.

The signals ALS and AEC1 to AEC3 are input to a differential comparator 11 and the difference between the signal AEC1 and the signal AEC2 (AEC1~AEC2) and the difference between the signal AEC2 and the signal AEC3 (AEC2~AEC3) are determined and, in accordance with their positive or negative signs, square wave signals are formed. As shown in FIG. 6, the digital element signals dEC1 and dEC2, which have a 90° phase difference with respect to the digital line synchronization signal dLS, are obtained.

When the signal dEC1 and dEC2 are input to the double frequency circuit 12 and their exclusive "or" is obtained, the element clock DEC has a frequency double the frequency of the digital element signals dEC1 and dEC2.

On the other hand, by inputting the digital line synchronization signal dLS, which is output from the differential comparator 11, to the synchronous circuit 13, and synchronizing the same with the element clock DEC, a predetermined line synchronization DLS can be obtained.

There is a 90° phase difference between the digital elements signals dEC1 and dEC2, and the phase difference corresponds to the moving direction of the carriage 2. If the moving direction of the carriage 2 is reversed, the phase difference is also reversed. Therefore, it is possible to tell the moving direction of the carriage 2 from the two element signals dEC1 and dEC2.

Furthermore, the frequency of the element clock DEC is proportional to the moving speed of the carriage 2.

Therefore, when the element clock DEC is input to a frequency-voltage converter, a voltage proportional to the moving speed of the carriage 2 can be obtained.

As a result, when a voltage corresponding to the moving direction and speed of the carriage 2 is produced in the servo-control circuit 14 on the basis of the digital element signal dEC1 and the element DEC, and the thus produced voltage is used as the speed feed back voltage for controlling the speed of the D.C. motor 3, the speed of the carriage 2 can be controlled to be constant without using a tachometer generator.

The element clock DEC is generated at a constant pitch (8 lines/mm) and the line synchronization DLS is generated at the opposite ends of the effective image width in synchronization with the element clock DEC. Therefore, when the scanning position is determined using these signals, predetermined read and record scannings can be performed.

To be more specific, as shown in FIG. 6, a LOAD signal is produced at the rise of the line synchronization DLS by the circuit 14 and is then input to a read control circuit 15. With each element clock DEC input to the read control circuit 15, the light receiving element array (P.D.A.) of the reading head 2a is actuated and the image information corresponding to a plurality of bits in the subscanning direction is taken out and is then successively input to the buffer 17, simultaneously with the generation of the LOAD signal, under the control of the system control unit 16. As a result, the image information for the plurality of lines in the subscanning direction, which has been read in synchronization with the element clock DEC within the effective image width, is stored in the buffer 17. This image information is transmitted to a receiving side under the control of the system control unit 16 through the data compressor 18 and the modem 19.

On the other hand, image information sent from the receiving side is stored in the buffer 17 from the modem 19 and the data compressor 18.

As mentioned previously, the moving direction of the carriage 2 can be determined from the digital element signal dEC1 and dEC2, and the circuit 14 generates a TAB signal which indicates the period of time for the carriage 2 to move forward, TF, and the period of time for the carriage 2 to move backward, TB, as shown in FIG. 6, and the TAB signal is input to the record control circuit 20.

The record control circuit 20 takes the image information for a plurality of bits in the subscanning direction from the buffer 17 in synchronization with the element clock DEC, with the line synchronization DLS1 input to the record control circuit 20 as a cue, during the forward movement period, TF, in which the TAB signal is being generated. The record control circuit 20 then outputs the image information to the recording head 2b with a certain delay. By the line synchronization DLS2, the taking of the image information from the buffer 17 is terminated. On the other hand, recording is performed continuously while the TAB signal is being generated. Therefore, the record control circuit 20 outputs the delayed image information for a period even after the taking of the image information from the buffer has been completed, and the recording head 2 records the output image information. Therefore, since the image information to be recorded is blank, the recording head 2b completes the recording of one line including the blank information in the main scanning direction during the generation of the TAB signal.

Thus, by use of the signals obtained from the detector 2c, the speed control of the D.C. motor 3 for moving the carriage 2 at a constant speed is performed so that the reading and the recording are performed.

Figure 7:
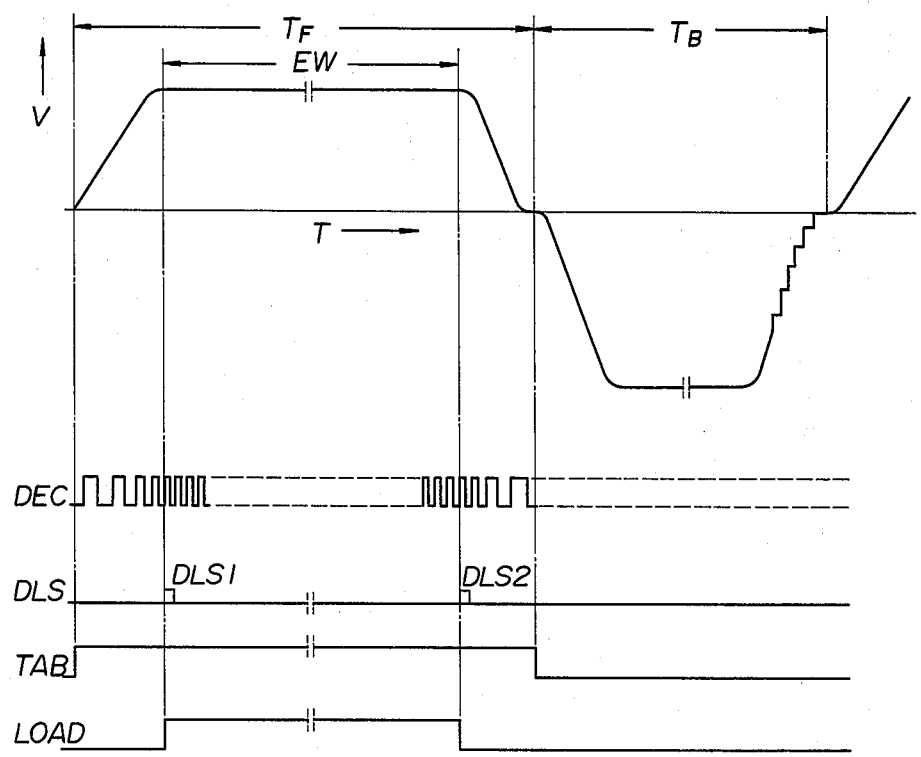
FIG. 7 is a wave form chart which shows the relationship between the speed of a carriage and element clock DEC, line synchronization DLS, TAB signal and LOAD signal in the embodiment of the facsimile apparatus of FIG. 3.

FIG. 7 shows the relationship between the speed V of the carriage 2 and the element clock DEC, the line synchronization DLS, the TAB signal and the LOAD signal, with time T as abscissa. The speed V of the carriage 2 is not constant in the opposite end areas in its movable range due to the inertia of the carriage 2 and the D.C. motor 3, so that the period of the generation of the element clock DEC varies as shown in FIG. 7. On the other hand, when the reading head 2a is constructed using a reading element (P.D.A.) which is operated under a charge storage mode, if the generation period of the element clock DEC is not set constant, the charge storage time varies and the level of the video signals taken from the reading head 2a varies depending upon each reading position, and, therefore, when the video signals are converted to binary signals, picture signals faithful to the image cannot be obtained. Therefore, the range where the generation period of the element clock DEC is constant and the moving speed of the carriage 2 is constant is set as the effective image width EW and the line synchronization DLS is generated at the opposite ends of the effective image width EW so that the reading and recording of the image information are performed within the range.

From the above, it can be considered that it will do that the element clock DEC be generated within the range of the effective image width EW. However, the fact is that it is required that the element clock DEC be generated in the range beyond the effective image width for the following reasons:

The first reason is that the speed of the D.C. motor 3 must be controlled in the starting and stopping areas. The second reason is that if the reading head 2a is not moved for a preliminary scanning before it enters the effective image width EW, the storage charges are saturated in the reading elements of the reading head 2a so that image information cannot be taken out properly at the initial main scanning position. The third reason is that since the image information is applied to the recording head 2b with a certain delay, the element clock DEC is required even after the completion of the generation of the line synchronization DLS2.

Therefore, in the present embodiment, the slits 1a are formed in the plate 1 beyond the effective image width EW for the read and record scanning.

Therefore, according to the present embodiment, by the simple mechanism, the element clock DEC can be generated in the range beyond the effective image width EW and the carriage 2 can be reciprocated throughout the range beyond the effective image width EW so as to give the carriage 2 a sufficient preliminary scanning period and, at the same time, the speed of the carriage 2 can be controlled accurately within the effective image width EW.

Furthermore, in the present embodiment, signals S1~S3, which are different from each other in phase by 90°, are taken from the detector 2c. However, the present invention is not limited to that method.

As the signals to be taken from the detector 2c, two signals with different phases can be used.

Furthermore, in the above-mentioned embodiment, the element clock DEC is produced by the double frequency circuit 12 on the basis of the two digital element signals dEC1 and dEC2. The element clock DEC can be produced by either of the digital element signals dEC1 and dEC2.

As a matter of course, when the pitch of the slits 1a coincides with the scanning line density, the element clock of double frequency is unnecessary and the digital element signal can be used as the element clock.

What is claimed is:

1. A facsimile apparatus comprising:
a reading head;
a recording head;
a carriage means on which said reading head and said recording head are mounted and which can be reciprocated in the main scanning direction;

a scale plate having a plurality of slits formed therein in the main scanning direction with a predetermined pitch;

a detector means which is mounted on said carriage and which traces said scale plate as said carriage means is reciprocated and which outputs a predetermined signal corresponding to each of said slits; and a D.C. motor for reciprocating said carriage means, the speed of said D.C. motor and the speed of said carriage means in the main scanning direction thereof being controlled in accordance with said signal output from said detector means so that said carriage means is caused to run at a constant speed.

2. A facsimile apparatus as claimed in claim 1, wherein said reading head has a plurality of reading elements and said recording head has a plurality of recording elements, said reading elements and said recording elements being arranged in the subscanning direction, and the image information for a plurality of lines can be read or recorded at one time by said reading head or said recording head.

3. A facsimile apparatus as claimed in claim 1, wherein said scale plate has at least two types of rows of slits formed in the main scanning direction and, by the signals output from said detector means, the position of said carriage in the main scanning direction thereof is detected and whether or not the detected position is within the effective image range where recording and reading of image information can be done is also detected.

4. A facsimile apparatus comprising:

a reading head;

a recording head;

a carriage means on which said reading head and said recording head are mounted and which can be reciprocated in the main scanning direction;

a scale plate having a plurality of slits formed therein in the main scanning direction with a predetermined pitch;

a detector means which is mounted on said carriage and which traces said scale plate as said carriage means is reciprocated and which outputs a predetermined signal corresponding to each of said slits; and a D.C. motor for reciprocating said carriage means, the speed of said D.C. motor and the speed of said carriage means in the main scanning direction thereof being controlled in accordance with said signal output from said detector means;

wherein said detector means comprises a mask plate having a plurality of openings, which are positioned in predetermined different positions with respect to the plurality of said slits formed in said scale plate, and a plurality of detector elements which are positioned so as to correspond to said openings, and the speed of said D.C. motor and the reading and recording of image information are controlled by said plurality of signals output from said plurality of detector elements.

5. A facsimile apparatus as claimed in claim 4, wherein each of said detector elements comprises a pair of elements, a light emitting element and a light receiving element.

6. A facsimile apparatus as claimed in claim 1, wherein said scale plate has slits in the main scanning direction throughout a range broader than the effective image width in which recording and reading of image information can be performed by said carriage means, whereby the speed of said carriage means can be controlled by said signals output from said detector means even if said carriage means is positioned beyond said effective image width.

* * * * *